Dec. 1, 1953    R. W. FALCONER    2,661,099
TUBE DELIVERY APPARATUS
Filed Sept. 23, 1948    4 Sheets-Sheet 1
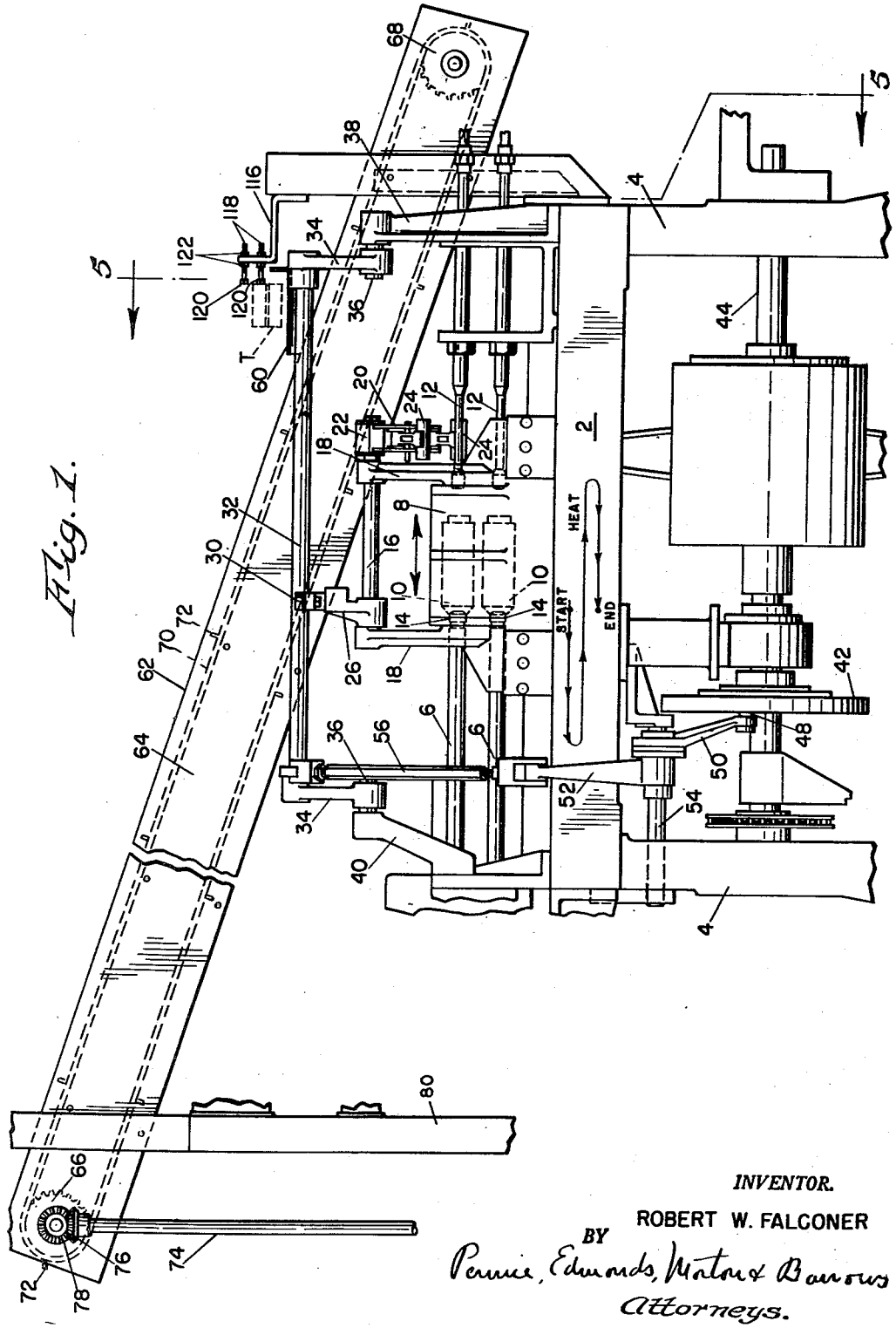
INVENTOR.
ROBERT W. FALCONER
BY
Pennie, Edmonds, Morton & Barrows
Attorneys.

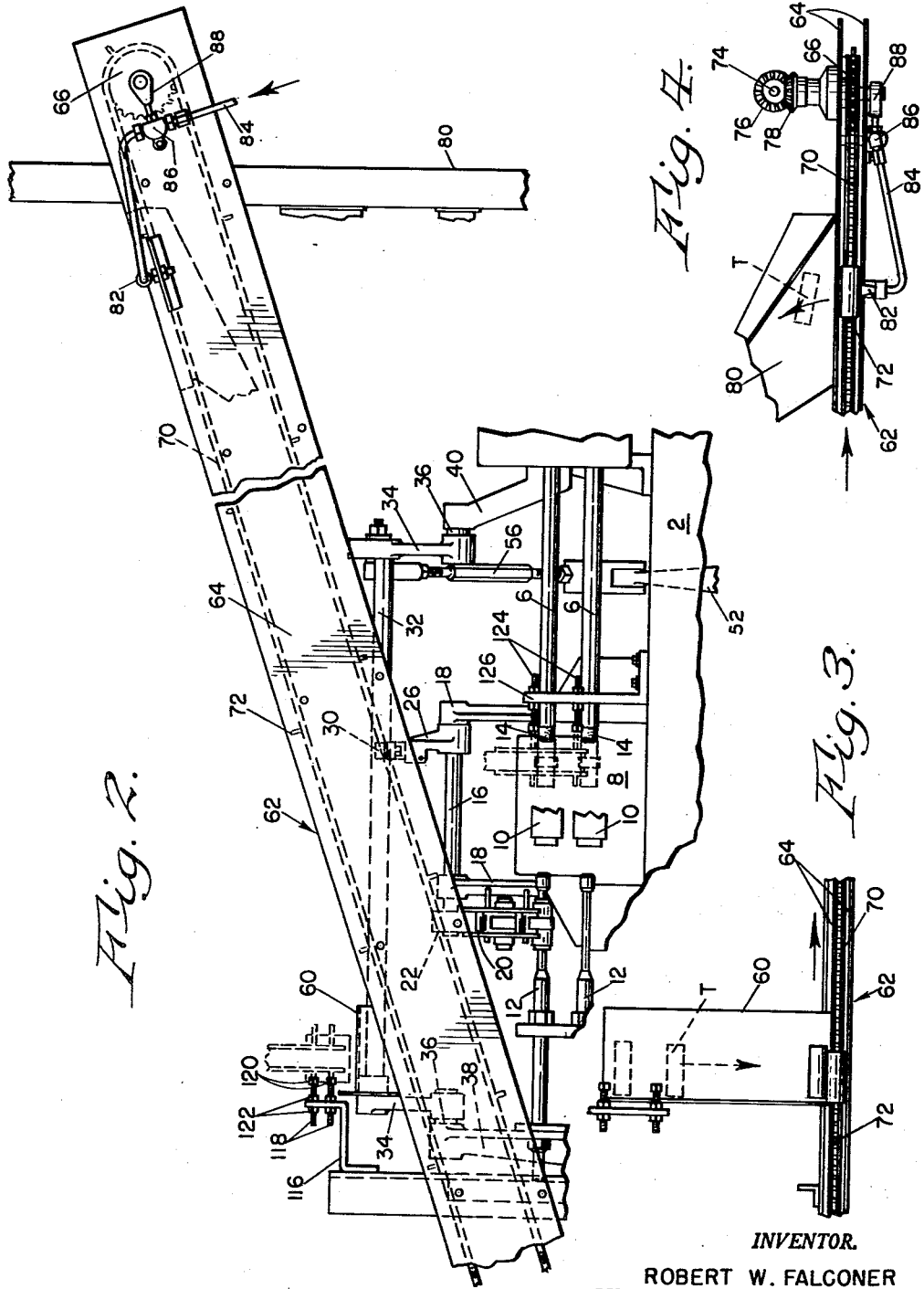

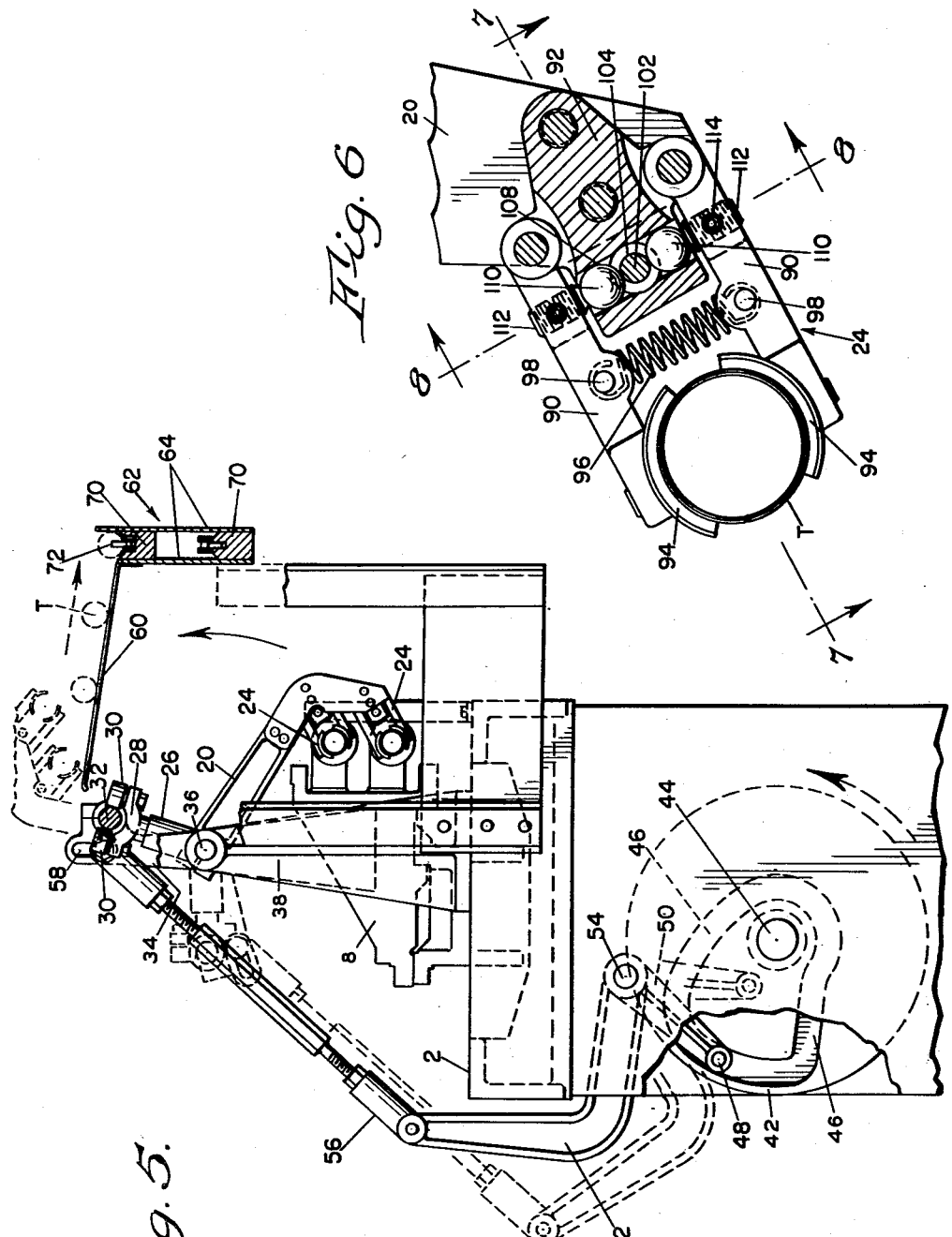

Dec. 1, 1953  R. W. FALCONER  2,661,099
TUBE DELIVERY APPARATUS
Filed Sept. 23, 1948  4 Sheets-Sheet 4
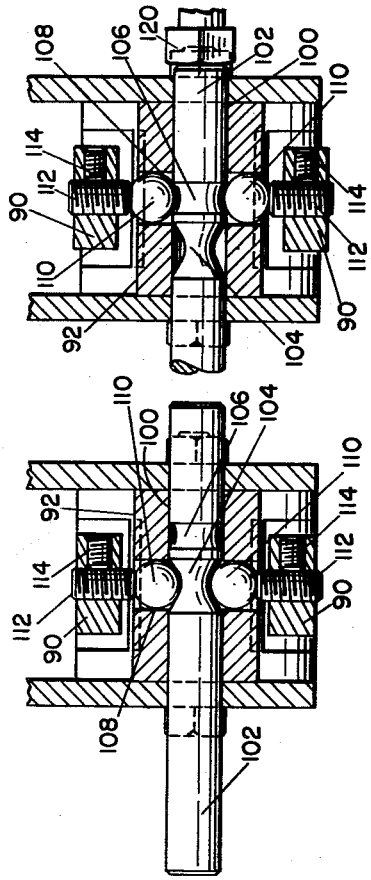
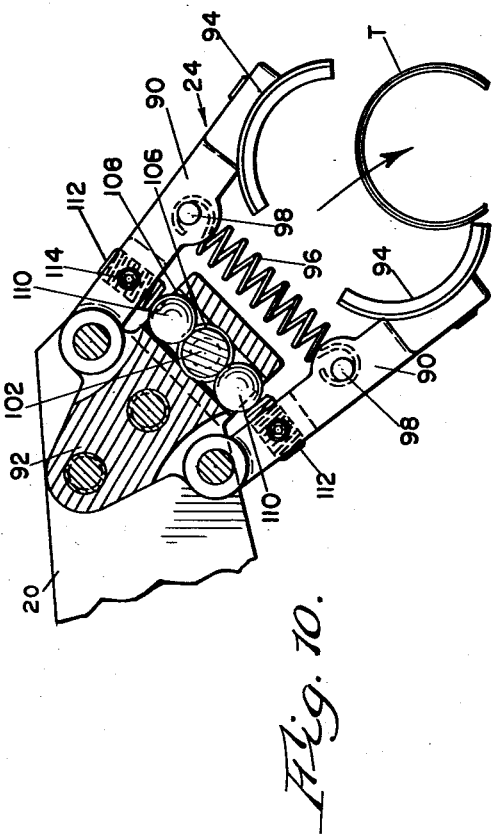
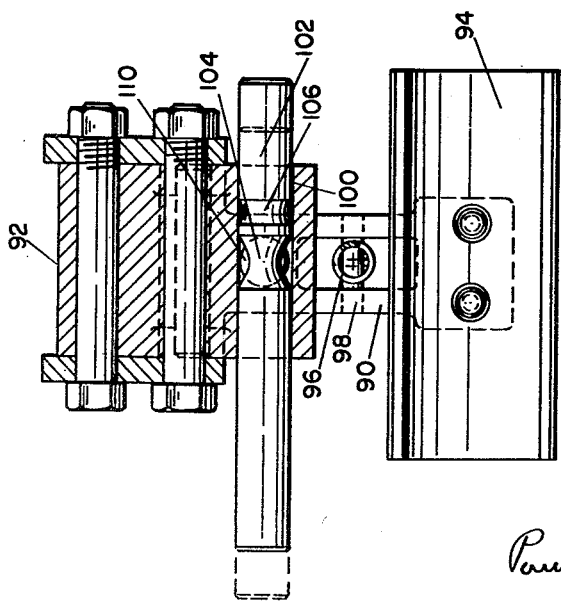
INVENTOR.
ROBERT W. FALCONER
BY
Parmie Edmonds Morton & Barrows
Attorneys.

Patented Dec. 1, 1953

2,661,099

UNITED STATES PATENT OFFICE 2,661,099

TUBE DELIVERY APPARATUS

Robert W. Falconer, Lancaster, N. Y., assignor to Daystrom Incorporated, Elizabeth, N. J., a corporation of New Jersey Application September 23, 1948, Serial No. 50,771

5 Claims. (Cl. 214—1)

This invention relates to delivery mechanism and more particularly to an apparatus for receiving tubular bodies from a bonding machine on which they are formed and transferring them to a chute for delivery to another mechanism or machine for subsequent operations.

In a prior application of Howard G. Allen and Charles D. Thomas, Serial No. 625,762, filed October 31, 1945 (now Patent No. 2,509,715, granted May 30, 1950), there is disclosed and claimed a machine in which sheet material, either thermoplastic or coated with a thermoplastic, is wound upon a mandrel, placed in a die, and while in the die, carried over a fusing nozzle to seal the layers of material to each other and form a tubular body. While such machine may be employed for making tubular bodies for any desired purpose, the machine has in fact been used in the manufacture of collapsible tubes. After the tubular bodies are formed, it is necessary to transfer them to another apparatus to form the shoulder and neck of the collapsible tube.

In th present invention I provide a transfer mechanism consisting of a pair of jaws to receive the tubular body. These jaws are carried by a pivotally mounted arm which swings downwardly to receive the tubular body on the end of the mandrel. The arm, after receiving the tubular body, then swings upwardly away from the mechanism of the bonding machine. Means are provided for moving the arm and jaws longitudinally to bring them into a position over a chute into which the tubes are delivered. The jaws are biased to a closed position by spring pressure but at the end of each movement, when about to deliver the tubular body to the chute, a pin carried by the jaws engages an operating member to move it and cause the jaws to open. When the jaws are again in position to receive a tubular body, the pin is engaged by a second member to close them.

In the accompanying drawings I have shown one embodiment of the invention. In this showing:

Fig. 1 is a front elevation of a portion of a bonding machine showing the invention applied;

Fig. 2 is an elevation of portions of the bonding machine from the opposite side;

Fig. 3 is a plan view of the chute and the adjacent portion of the conveyor;

Fig. 4 is a plan view of the opposite end of the conveyor and of a chute by means of which the tubular bodies are conveyed to the next piece of apparatus;

Fig. 5 is a vertical, sectional view on line 5—5 of Fig. 1;

Fig. 6 is a detailed, enlarged view of the end of the arm and of a pair of gripping jaws;

Fig. 7 is a detailed, sectional view on line 7—7 of Fig. 6;

Fig. 8 is a detailed, sectional view on line 8—8 of Fig. 6;

Fig. 9 is a similar view with the operating pin in a second position; and

Fig. 10 is a detailed, sectional view of the gripping jaws in opened position.

Referring to the drawings, the reference numeral 2 designates the bed of the bonding machine disclosed in the Allen and Thomas application, Serial No. 625,762. The machine is mounted on legs 4. At one end of the machine there is provided a pair of rotatable mandrels 6 upon which sheet material is wound. A carriage 8 is mounted to reciprocate on the bed. This carriage is provided with cylindrical open ended dies 10 in alignment with the mandrels. At the opposite end of the machine a pair of fusing nozzles 12 are arranged in alignment with the dies and the mandrels. In the operation of the bonding machine, sheet material is fed to the mandrels while the mandrels are being rotated and the mandrels are connected to a source of suction to cause the sheet material to wind upon the mandrels. The carriage 8 and dies 10 are then reciprocated over the mandrels and the suction shifted to pressure to cause the wound sheet material to adhere to the walls of the dies. The carriage is then reciprocated in the opposite direction over the fusing nozzles. Heated air is delivered from the fusing nozzles to cause the thermoplastic material, of which the sheets are formed, or with which the sheets are coated, to seal the layers of the tubes to each other. The carriage is then reciprocated in the opposite direction and tube ejecting devices 14 on the ends of the mandrels are expanded to limit the movement of the tubes and thereby cause them to be pushed out of the dies as the carriage continues its movement toward the left in Fig. 1. The parts heretofore described form no part of the present invention and are illustrated diagrammatically herein for the purpose of permitting a more complete understanding of the invention herein disclosed and claimed.

After this bonding operation, the tubular bodies which have been formed are conveyed to another machine to form the neck and shoulder of a collapsible tube. The mechanism for accomplishing this purpose, which forms the subject matter of the present invention, consists of a shaft 16 which is rotatably mounted in bearings formed in brackets 18 carried by the carriage. A pick-off arm 20 is carried by a sleeve 22 secured to the shaft 16. This pick-off arm carries tube holders or clamps 24 to receive the tubes ejected from the carriage by the expanding devices 14. The number of tube holders will correspond to the number of sets of mandrels, dies and fusing nozzles and is herein illustrated as two (see Fig. 5).

An arm 26 is also secured to shaft 16 and this arm is provided with a cradle 28 at its other end in which a pair of rollers 30 is mounted. These rollers engage the opposite sides of a shaft 32 to guide the previously described structure as the carriage 8 is reciprocated. Shaft 32 is carried by levers 34 which are secured to stub shafts 36. The stub shafts 36 are mounted in brackets 38 and 40 on the bed of the machine in alignment with the shaft 16.

The pick-off arm 20 is oscillated through an arc indicated by the full line and dotted line positions shown in Fig. 5 of the drawings from a cam 42 mounted on a shaft 44 which drives parts of the bonding machine. This cam (see Fig. 5) is provided with a cam track 46. The cam track 46 receives a roller 48 mounted on an arm 50. Arm 50 and an arm 52 form a bell crank lever which is rotatably mounted on a shaft 54 carried by the frame of the machine. The free end of arm 52 is pivotally connected to a connecting rod 56. The upper end of this rod is adjustably mounted in a slot 58 formed in the upper end of the left hand lever or arm 34 shown in Fig. 1. It will thus be seen that in the proper sequence of operations the pick-off arm 20 is oscillated from its lower position shown in full lines in Fig. 5 and also shown in Fig. 1 to the position shown in dotted lines in Fig. 5.

To raise the pick-off mechanism from its lower position, in which it receives the tube bodies from the mandrels, the carriage 8 is moved horizontally to the right, Fig. 1. This horizontal movement to the right must continue a distance sufficient to clear the tube bodies from the expanding devices 14 at the ends of the mandrels before the pick-off arm 20 can be raised.

While the carriage continues its right hand travel through connection of its lever with the carriage cam, the cam 42 operates to raise the arm 20 to the upper position shown dotted in Fig. 5. At the extremity of the right hand travel of the carriage the upper end of arm 20 and the clamps or holders 24 thereon will travel horizontally a short distance, after clearing chute 60, during which time the bodies are released to fall on that chute.

The pick-off mechanism mounted on the carriage is guided in this movement by the engagement of rollers 30 with shaft 32. At its extreme movement in this direction the tubes T, indicated in dotted lines in Fig. 1 of the drawings, are delivered to an inclined chute 60. The tubes roll down this chute, as indicated by the arrows in Fig. 5, and are received by a conveyor 62. The conveyor 62 carries the tubes upwardly and delivers them to another machine for further operations. As shown, the conveyor consists of a pair of frame members 64 having sprockets 66 and 68 at its opposite ends. An endless chain 70 passes over these sprockets and this chain is provided with pins 72 at suitable intervals against which one end of a tube engages to propel the tube from the point where it is received by the conveyor near the bottom of its operative flight to the top of the conveyor.

The conveyor may be driven in any suitable manner and I have illustrated a drive shaft 74 connected to a suitable part of the machine and having a bevel gear 76 on its upper end. This gear in turn meshes with a bevel gear 78 carried by the shaft of the upper sprocket 66. Near the upper end of the operative flight of the conveyor the tube is delivered to a second inclined chute 80. This is accomplished by an air blast, the air being delivered at one side of the conveyor through a nozzle 82 from pipe 84. The pipe 84 may be provided with a valve 86 which is opened by a cam 88 on the shaft of sprocket 66. The inner side wall 64 of the conveyor frame may be cut away in alignment with the chute 80 so that when the valve 86 is opened by the cam 88 and a blast of air is delivered transversely of the conveyor, the tube T is blown from the conveyor into the chute as indicated in dotted lines and by the arrow in Fig. 4.

Suitable mechanism is provided for opening the tube holders or clamps 24 when a tube is to be delivered to the chute 60. The construction of these parts is shown in detail in Figs. 6 to 10 of the drawings. As shown, each tube holder consists of a pair of arms 90 pivotally mounted on a support or base 92 secured to the pick-off arm 20. Adjacent their outer ends the arms 90 carry arcuate shaped holding members 94. The arms 90 are biased toward a closed position by a spring 96, the ends of which engage pins 98 carried by the arms. The block or base 92 is provided with a bore 100 for the reception of an actuating pin or member 102. This pin is provided with two portions of reduced diameter 104 and 106, the portion 104 being of lesser diameter than the portion 106.

Intersecting the bore 100 at a point intermediate the ends of the block 92 is a transverse passage 108. A ball 110 is mounted in this passage at each side of the pin or operating member 102. These balls are engaged by threaded pins 112 carried by the arms 90. The threaded pins are provided to permit adjustment and are held in adjusted position by set screws 114.

Adjacent the chute 60 (see Fig. 1) I provide a bracket 116 mounted on a suitable portion of the machine and this bracket carries a pair of stops 118 each of which is engaged by one end of one of the operating pins 102 to open the tube holders when the pick-off arm is in position over the chute. As shown, the stops 118 may be in the form of threaded rods having heads 120 and may be adjusted in the bracket 116 through nuts 122. Likewise, at the other end of the cycle, the jaws are actuated by stops 124 carried by a bracket 126 mounted on the frame of the machine.

With the parts in the full line position shown in Figs. 7 and 8, the balls 110 are in the deepest depression 104 of the pin 102 permitting the jaws to close. This position is assumed with the pick-off arm in lowered position and ready to receive the tubes T from the mandrel. With the balls in the shallower depression 106, illustrated in Figs. 9 and 10 of the drawings, the jaws are in the open position. This position is assumed when the pin 102 engages the stops 118 with the pick-off mechanism over the chute 60 to deliver the tubes to the chute. The second depression is provided to prevent the pin 102 from creeping lengthwise and causing the jaws to open at the wrong time.

In operation with the parts in the position shown in Fig. 1, the carriage 8 is in its intermediate position and is about to move over the mandrels to receive a pair of tubes which have been wound on the mandrels. If we assume that the machine has been operating, a pair of tubes in the dies 10 will be pushed from the carriage by the expanding devices 14. As the carriage moves toward the left in Fig. 1, the jaws of the tube holders are open with the balls 110 in the shallower depressions 106 of the pins 102. After the carriage has moved to a point where the pick-off mechanism is in the dotted line position shown in Fig. 2, the operating pins 102 engage stops 124 and close the jaws around the tubular bodies T. After the carriage has moved somewhat farther to free the tubes from the members 14, cam 42 then swings the bell crank lever from the full line position shown in Fig. 5 of the drawings to the dotted line position. This causes the pick-off mechanism, including the arm 20, the arm 26 and the shaft 32, to swing about the shaft 36 to the raised position. Movement of the carriage from the left to the right in Fig. 1 of the drawings to bring the tubes in the dies over the fusing nozzles 12 then causes the shaft 16 and the pick-off mechanism to travel toward the right bringing the pick-off arm and the tube holders over the chute 60. In this reciprocating travel the parts are guided by the engagement of the rollers 30 with shaft 32. As the arm and the tube holders 24 reach a position over the chute 60, the pins 102 are engaged by the stops 118 moving the pins to the left from the position shown in Fig. 8 to the position shown in Fig. 9 and bringing the balls 110 into the shallower depression 106. This forces the arms 90 outwardly against the tension of the spring 96 to open the tube holders or jaws and release the tubes.

The tubes then roll down the chute 60, as indicated by the arrow in Fig. 3 of the drawings, and are deposited on the conveyor. Pins 72 cause the tubes to be carried upwardly by the conveyor and as each tube reaches a position opposite the chute 80, valve 86 is opened by cam 88. This delivers a blast of air to the nozzle 82 which removes the tube from the conveyor on to the chute 80. Chute 80 conveys the tube to the next machine in the sequence of operations.

I claim:

1. Pick-off mechanism for the delivery of tubular bodies comprising an arm, a support carried thereby, a pair of jaws pivotally mounted on the support, a spring connected to the jaws to urge them to a closed position, the support being provided with a bore, an operating pin in the bore, the support being further provided with a passage at right angles to the bore, and balls arranged in the passage and engaging the operating pin and the jaws, the pin having a reduced portion which permits closing of the jaws by the spring and having a second reduced portion shallower than the first reduced portion, the balls when arranged in the second reduced portion retaining the jaws in open position.

2. Pick-off mechanism comprising an arm, a pair of jaws mounted on the arm, a shaft to which the arm is secured, a second shaft parallel to the first shaft, arms connected to the second shaft, pivots for the arms in alignment with the first shaft, means for oscillating the second shaft about the pivots, a connection between the shafts to permit axial movement of the first shaft and to transmit oscillation of the second shaft to the first shaft to rotate it on its axis and means for moving the first shaft axially of the second shaft.

3. Pick-off mechanism comprising an arm, a pair of jaws mounted on the arm, a shaft to which the arm is secured, a second shaft parallel to the first shaft, arms connected to the second shaft, pivots for the arms in alignment with the first shaft, means for oscillating the second shaft about the pivots, an arm secured to the first shaft having its end shaped to engage opposite sides of the second shaft to permit axial movement of the first shaft and to transmit oscillation of the second shaft to the first shaft to rotate it on its axis, and means for moving the first shaft axially of the second shaft.

4. Pick-off mechanism for the delivery of tubular bodies comprising an arm, a support carried thereby, a pair of jaws pivotally mounted on the support, a spring connected to the jaws to urge them to a closed position, the support being provided with a bore, an operating pin in the bore, the pin being provided with a pair of reduced portions, one of which is shallower than the other, and members carried by the support adapted to be received in either of said reduced portions, the members when received in the deeper reduced portion permitting the spring to close the jaws and when received in the shallower reduced portion retaining the jaws in open position.

5. Pick-off mechanism comprising an arm, a pair of jaws mounted on the arm, a shaft to which the arm is secured, a second shaft parallel to the first shaft, means for oscillating the second shaft about the axis of the first shaft, a connection between the shafts to transmit oscillation of the second shaft to the first shaft to rotate it on its axis, the connection permitting axial movement of the first shaft, and means for moving the first shaft axially.

ROBERT W. FALCONER.

References Cited in the file of this patent

UNITED STATES PATENTS

| Number | Name | Date |
|---|---|---|
| 1,150,240 | Avery | Aug. 17, 1915 |
| 1,174,814 | Brennan et al. | Mar. 7, 1916 |
| 1,227,244 | Buhles | May 22, 1917 |
| 1,766,574 | Westin et al. | June 24, 1930 |
| 1,786,608 | Halstead | Dec. 30, 1930 |
| 1,926,041 | Freese | Sept. 12, 1933 |
| 2,123,363 | Joplin | July 12, 1938 |
| 2,154,992 | Pearson | Apr. 18, 1939 |
| 2,168,419 | Paterson | Aug. 8, 1939 |
| 2,301,892 | Lewis | Nov. 10, 1942 |
| 2,332,058 | Cattonar et al. | Oct. 19, 1943 |
| 2,392,799 | Scholes | Jan. 8, 1946 |

FOREIGN PATENTS

| Number | Country | Date |
|---|---|---|
| 3,588 | Great Britain | Feb. 11, 1914 |